United States Patent
Harlan et al.

(10) Patent No.: US 8,910,049 B2
(45) Date of Patent: Dec. 9, 2014

(54) USER-INITIATED MODE FOR REMOTE SUPPORT

(75) Inventors: Jay Harlan, Fort Collins, CO (US); Andy Charles, Rocklin, CA (US); Roy Carlson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1009 days.

(21) Appl. No.: 12/859,803

(22) Filed: Aug. 20, 2010

(65) Prior Publication Data
US 2012/0047439 A1    Feb. 23, 2012

(51) Int. Cl.
G06F 15/177 (2006.01)
H04M 3/22 (2006.01)
G06F 11/30 (2006.01)

(52) U.S. Cl.
CPC ........ *G06F 11/3093* (2013.01); *G06F 11/3072* (2013.01); *G06F 11/3013* (2013.01); *G06F 11/3055* (2013.01)
USPC .......................................... 715/736; 379/9.03

(58) Field of Classification Search
USPC .......................................... 715/736; 379/9.03
See application file for complete search history.

(56) References Cited

U.S. PATENT DOCUMENTS

| | | | |
|---|---|---|---|
| 6,507,852 B1* | 1/2003 | Dempsey et al. | 1/1 |
| 7,232,063 B2 | 6/2007 | Fandel et al. | |
| 7,603,625 B2 | 10/2009 | Guillermo et al. | |
| 2004/0199828 A1* | 10/2004 | Cabezas et al. | 714/39 |
| 2004/0260704 A1* | 12/2004 | Moore | 707/100 |
| 2005/0038888 A1* | 2/2005 | Labertz | 709/224 |
| 2006/0112340 A1* | 5/2006 | Mohr et al. | 715/733 |
| 2007/0192700 A1* | 8/2007 | Sengar | 715/733 |
| 2008/0215727 A1* | 9/2008 | Denis et al. | 709/224 |
| 2009/0083588 A1 | 3/2009 | Yamashita | |
| 2009/0247136 A1 | 10/2009 | Srinivasan et al. | |
| 2010/0138270 A1* | 6/2010 | Werth et al. | 705/9 |

* cited by examiner

*Primary Examiner* — Andrea Long

(57) ABSTRACT

Some embodiments disclose a remote support system having an analyzer and a communication link to connect to an event log associated with a monitored system. The analyzer is to monitor the event log over the link and to create a report using information in the event log. In response to the analyzer detecting a user-initiated service mode indication in the information the analyzer includes in the report additional information relating to the user-initiated service mode to facilitate events in the report to be ignored.

20 Claims, 10 Drawing Sheets

FIG. 7

Configure user initiated service mode

[ Cancel ]   ?

User-initiated service mode allows you to perform service actions on your storage system without causing undue support calls.

Status

| Mode: | ⚠ Support calls will be ignored | ? |
| --- | --- | --- |
| Time left: | 29 minutes, 55 seconds | ? |
| Reason: | John Doe, test of UISM | |

Configuration

[ Restart service mode ] for [ 30 ] minutes   ?
[ Stop service mode ]

⚒ User-initiated service mode active on this storage system   ⚒

*FIG. 9*

USER-INITIATED MODE FOR REMOTE SUPPORT

BACKGROUND

Remote monitoring processes are known that capture events from managed systems, for example servers and storage devices, filter those events, and submit actionable events to a support provider system to facilitate provision of support for those events.

BRIEF DESCRIPTION OF THE DRAWINGS

In order that the invention may be well understood, various embodiments thereof will now be described, by way of example only, with reference to the accompanying drawings, in which:

FIGS. 5 to 9 respectively illustrate example screens of a graphical user interface to configure a user-initiated service mode.

DETAILED DESCRIPTION

Figure 1:
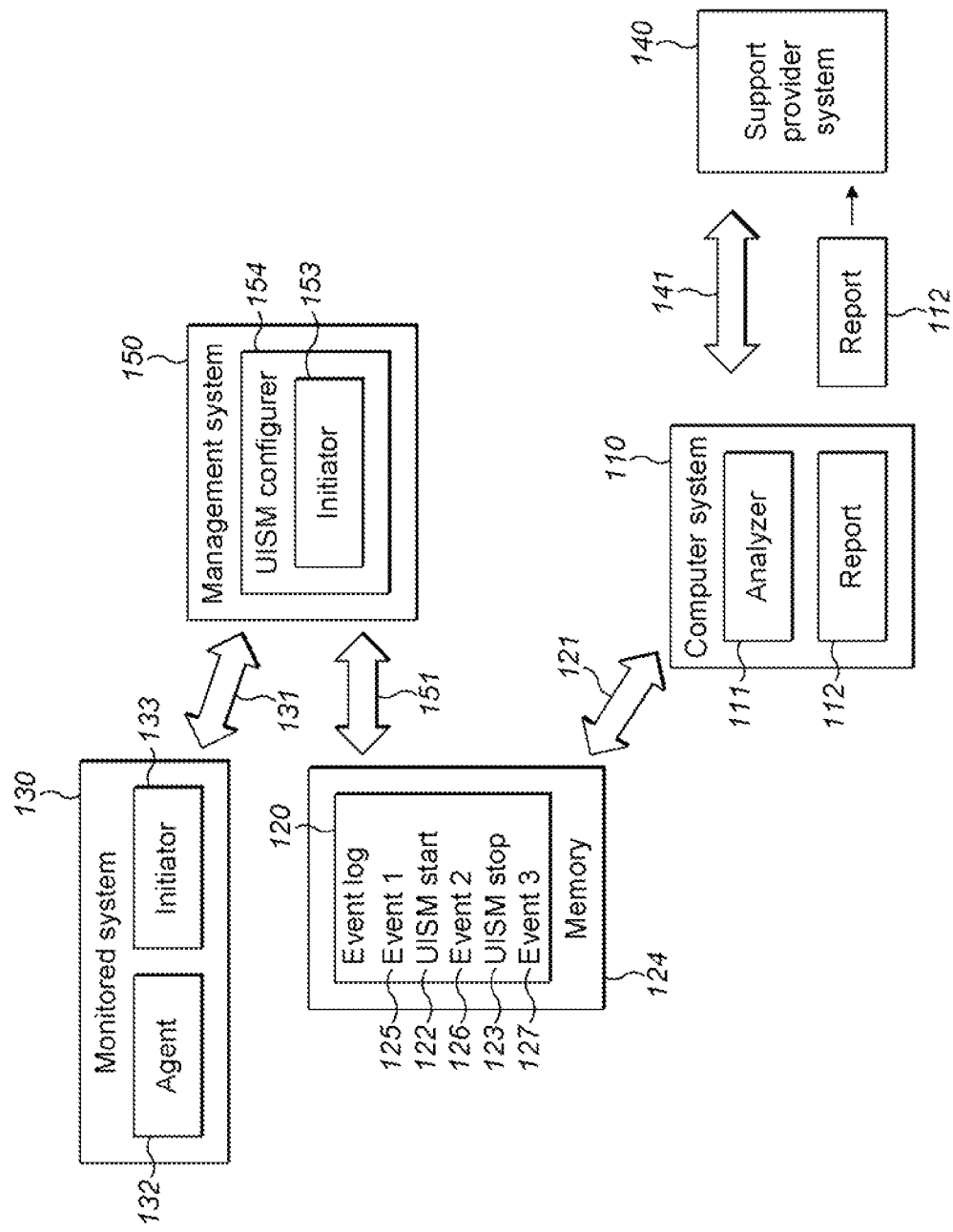
FIG. 1 a schematic diagram showing an example arrangement to monitor a monitored system and report to a support provider system.

Referring to FIGS. 1 to 4, according to at least some embodiments, a remote support system is provided comprising an analyzer 111 to monitor an event log 120 over a communication link 121 and to create a report 112 using information in the event log 120. The event log 120 is associated with a monitored system 130. For example, the event log 120 is implemented in computer-accessible memory 124, and stores event information 125, 126, 127 relating to respective monitored system events logged by a management system 150 over a communication link 151. The management system 150 obtains the event information from an agent 132 on the monitored system 130 over a communication link 131. Any convenient systems management technology can be used to expose management (event) information on the monitored system 130 and communicate the information to the management system 150.

According to at least some embodiments, there is provided a processor-implemented initiator 133, 153, the initiator being activatable to cause a user-initiated mode indication 122, 123 to be stored in the event log 120. In some examples, the initiator comprises a hardware actuator 133 of the monitored system 130, the actuator 133 being activatable by a user. Additionally or alternatively, the initiator comprises a user-activatable software-generated graphical user-input arrangement 153, for example provided as part of a user-initiated service mode configurer 154. The provision of the initiator 133, 153 facilitates convenient and reliable input of data relating to user-initiated events.

In response to the analyzer 111 detecting the user-initiated service mode indication 122, 123 in the event log information, the analyzer 111 includes in the report 112 additional information relating to the user-initiated service mode to facilitate events in the report 112 to be ignored. This facilitates that a support provider does not react unnecessarily to service incidents caused by known user-initiated events.

Figure 2:
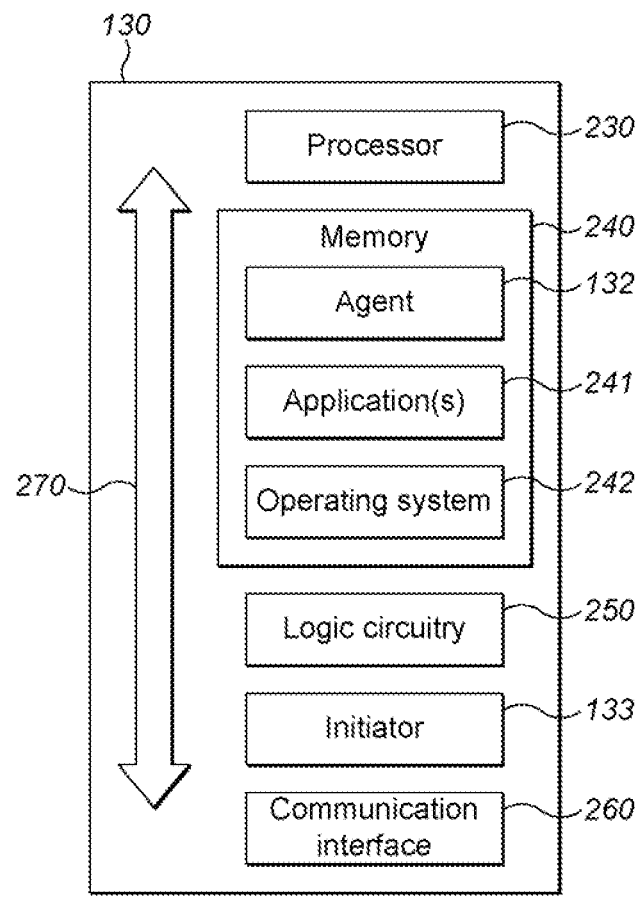
FIG. 2 illustrates an example monitored system of the arrangement in more detail.

In some implementations, the monitored system 130 comprises a processor 230, memory 240, hardware logic circuitry 250, a communication interface 260 and a communication link or bus 270, as best seen in FIG. 2. The memory 240 stores machine readable instructions loadable for execution in the processor 230 to provide functionality of the agent 132, an operating system 242, and one or more applications 241 providing the primary functions of the monitored system 130. At least some of the functionality of the monitored system 130 can in some examples be provided by hardware logic circuitry 250. In some examples, the monitored system 130 functions as a server or storage device, or any other general purpose or application specific computer system or appliance.

The hardware-based initiator 133 comprises a hardware actuator for example in the form of a physically depressable actuator or touch sensitive region with logic circuitry. Activation of the initiator 133 by a user causes the logic circuitry to communicate the activation to the agent 132 executing on the processor 230, for example using an interrupt or using polling by the processor 230 under control of the agent 132. The agent 132 communicates with the management system 150 over the communication link 131, for example using the communication interface 260.

Figure 3:
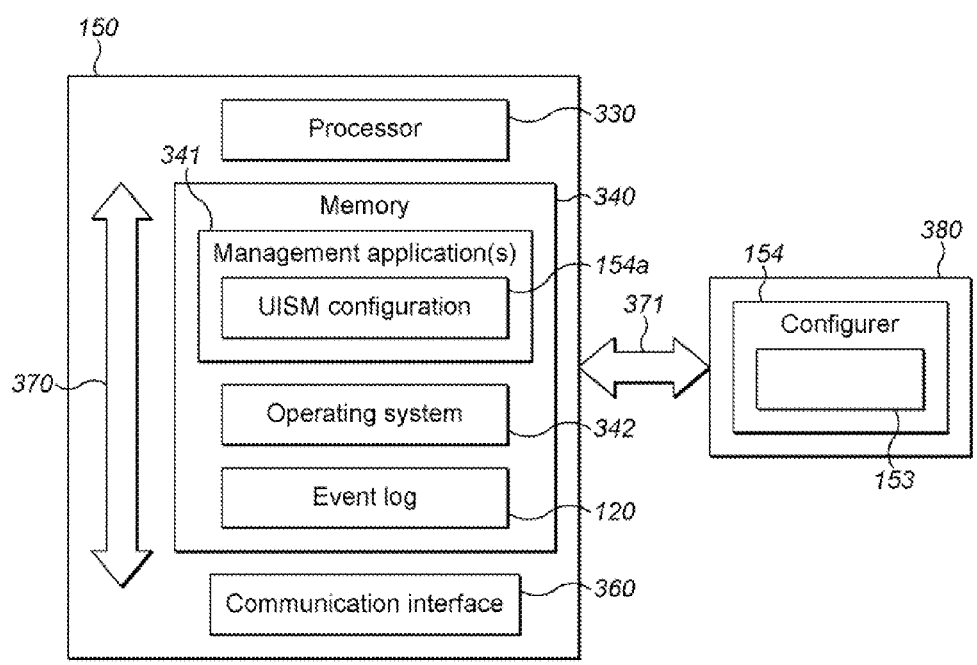
FIG. 3 illustrates an example management system of the arrangement in more detail.

In some implementations, the management system 150 comprises a processor 330, memory 340, a communication interface 360 and a communication link or bus 370, as best seen in FIG. 3. The memory 340 stores machine readable instructions loadable for execution in the processor 330 to provide the functionality of at least one management application 341 to obtain management information from and to manage the monitored system 130, and an operating system 342. At least some of the functionality of the management system 150 can in some examples be provided by hardware logic circuitry (not shown). In some examples, the management system 150 comprises a general purpose computer system.

The event log memory 124 in some examples is provided by the memory 340 of the management system 150, the communication link 151 being provided by the bus 370. In alternative examples, the event log 120 can be located in memory 124 in any other convenient location or system that permits the memory 124 to be communicatively connected to receive user-initiated mode indications from a processor implementing the initiator. For example, in some embodiments the management system 150 and monitored system and the event log 120 could be located on one computer system such as a general purpose server computer.

The management application 341 provides machine-readable instructions 154a executable by the processor 330 to provide the user-initiated service mode configurer 154, which includes an initiator 153 comprising a software-generated graphical user-input arrangement. In some examples, the configurer 154 generates a series of graphical user interface screens as shown in FIGS. 5 to 9, for display on a user input output device 380 communicatively connected to the processor 330, for example by an input/output bus 371 and the communication bus 370.

Figure 5:
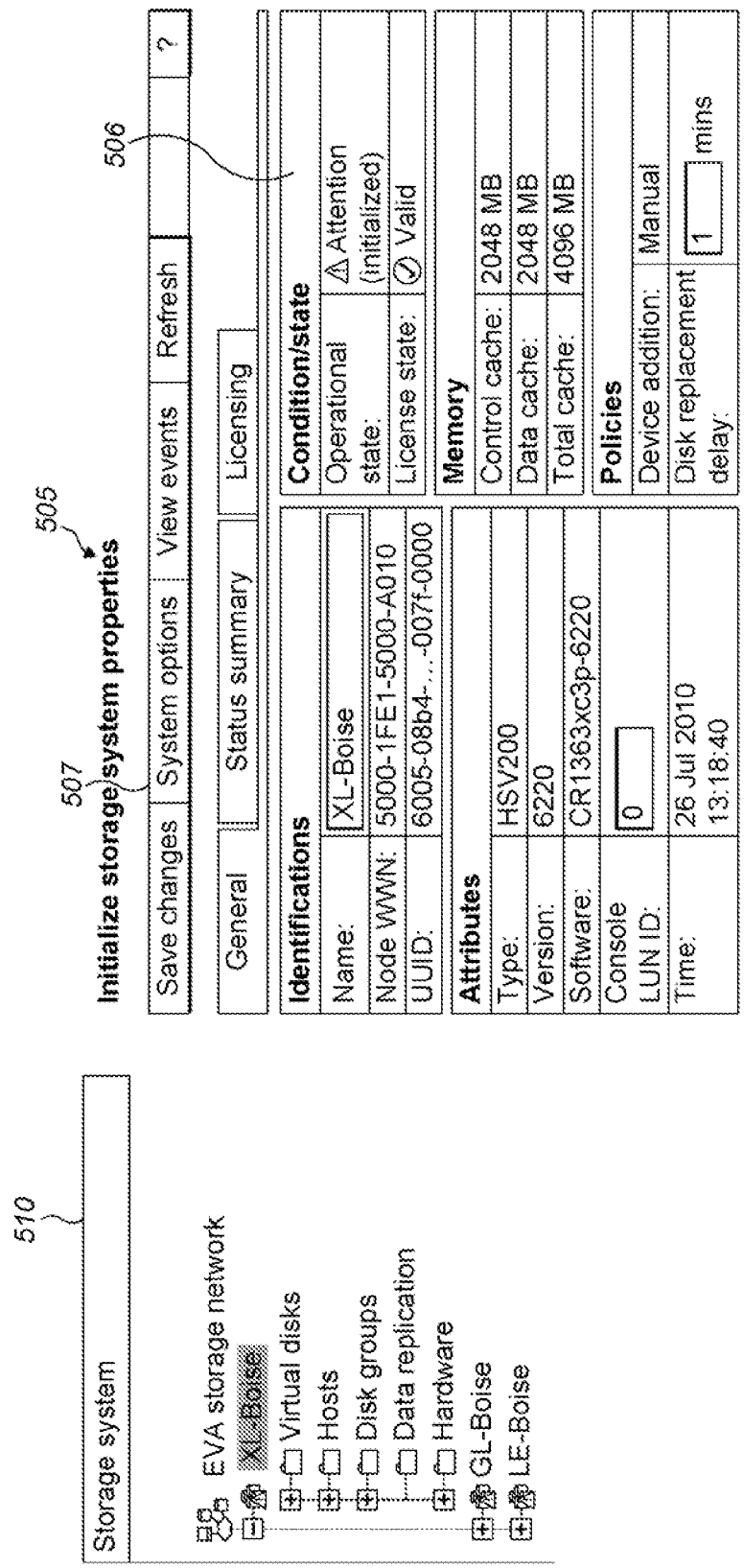
Figure 6:
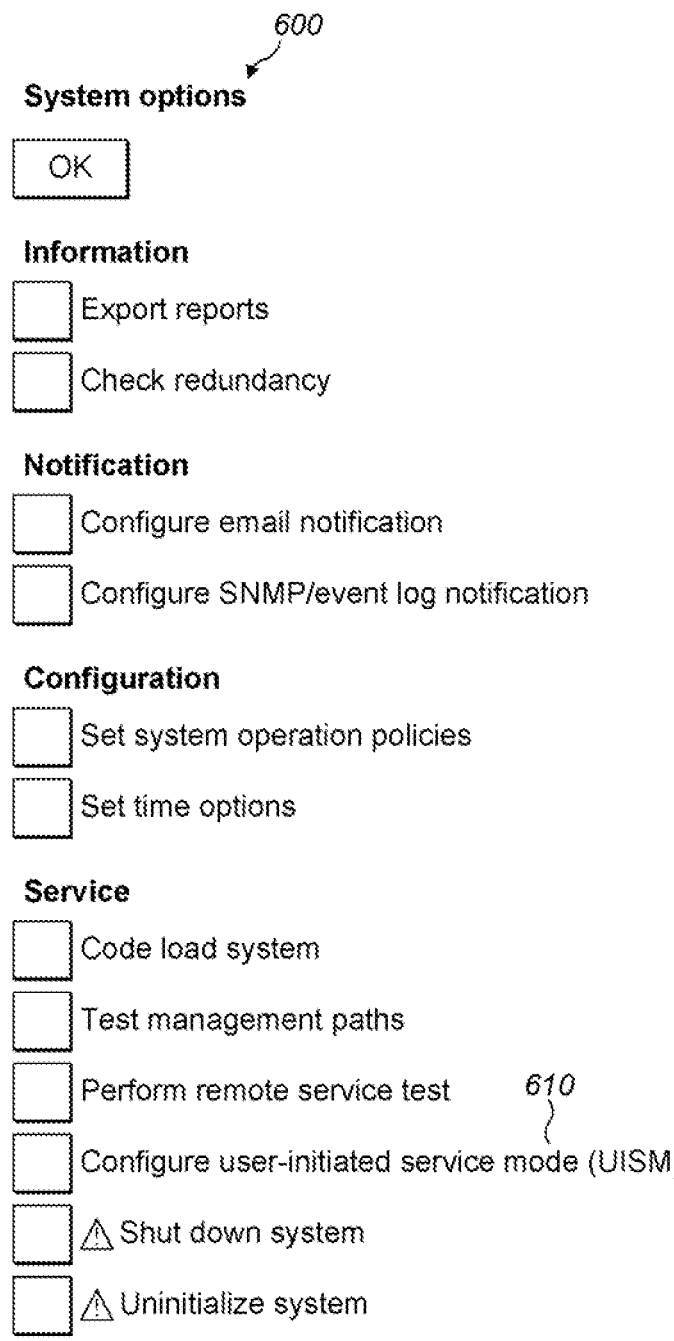
Figure 7:
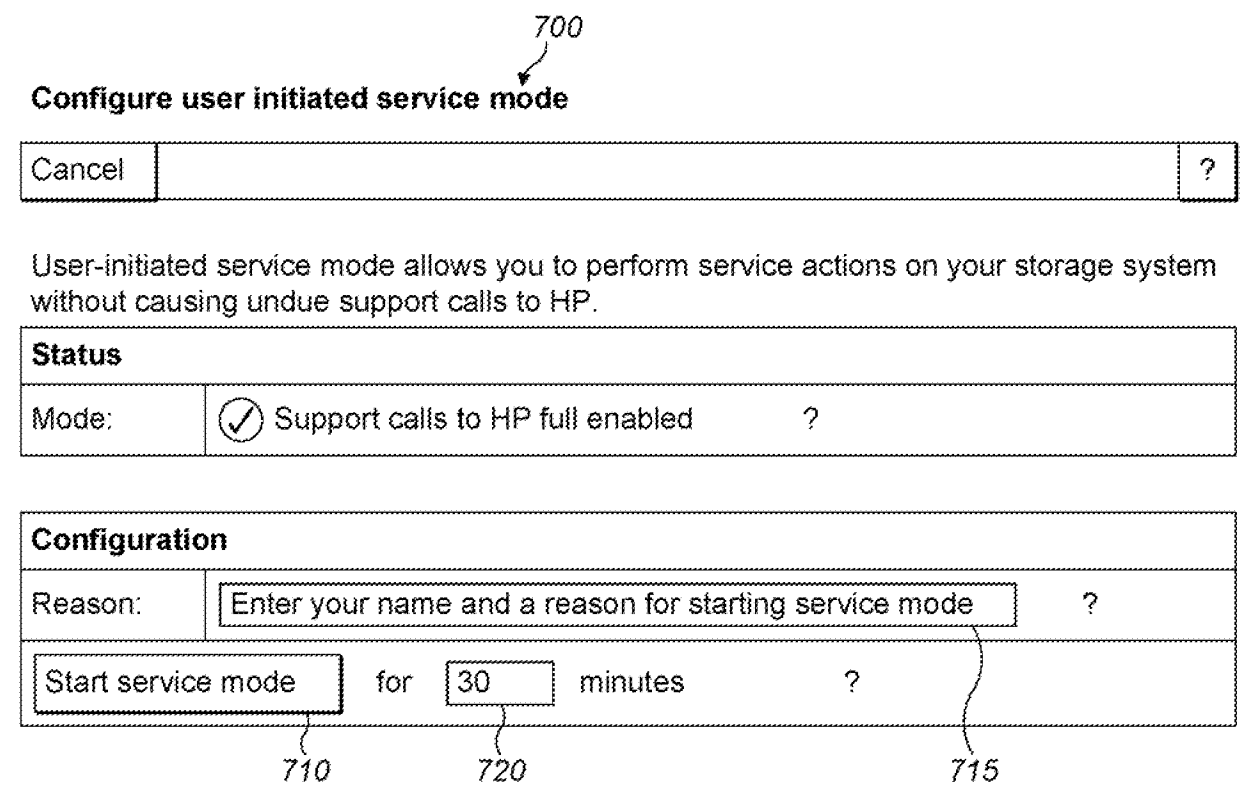
Figure 8:
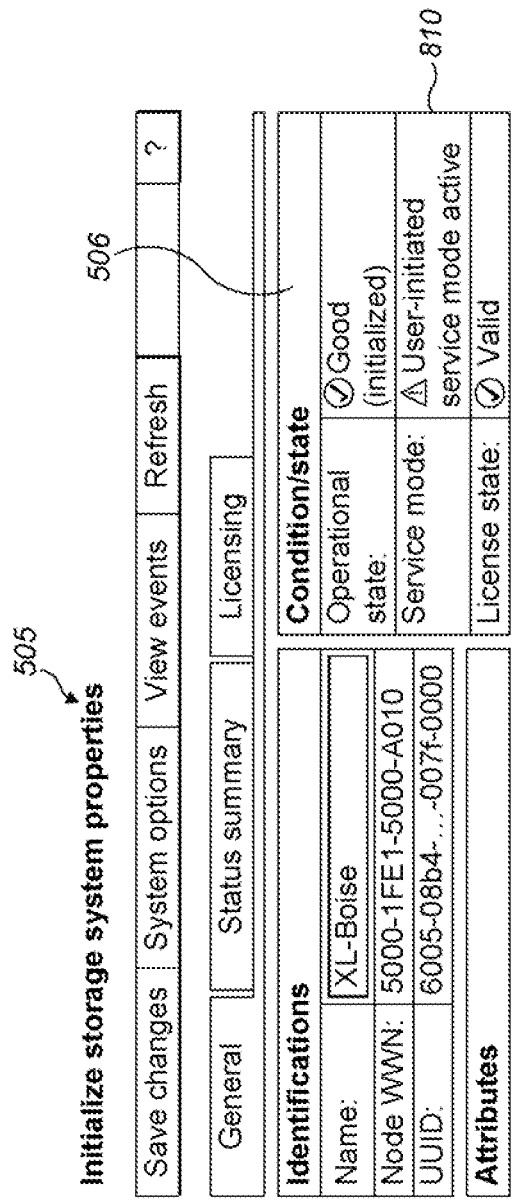

The screen of FIG. 5 relates to an example storage management application, and shows an initialized system properties screen 505. A system menu 510 is provided to list and enable selection of systems on a managed network, the properties of the presently selected system XL-Boise being populated in the fields of the system properties screen. The system menu 510 is omitted from FIGS. 6 to 9. In addition to identification, attribute, memory and policies information relating to the selected system, condition/state information 506 is provided, including operational and license state information. Activating a "system options" icon 507 of the initialized system properties screen 505 causes a system options screen 600 to display (FIG. 6). Activating a "configure user-initiated service mode (UISM)" icon 610 of the system options screen 600 causes a configure user-initiated service mode screen 700 to display (FIG. 7).

Activating a "start service mode" icon 710 of the configure user-initiated service mode screen 700 causes the processor 330 to store a user-initiated mode start indication 122 in the event log 120. In the example of FIG. 7, prior to enabling activation of the start service mode icon 710, a reason data input field 715 requires entering of information such as a name of the requestor and reason for starting the user-initiated mode, and a time parameter data input field 720 requires entering of a time value representing a duration of the user-initiated mode. The input time and reason data in some examples are stored in the event log 120 as part of the user-initiated mode indication 122.

In alternative examples, the reason and time data input fields are omitted, or are not required to be filled prior to activation of the start service mode icon 710. In some examples, in response to activation of the start service mode icon 710 a confirm user-initiated mode pop-up (not shown) displays, warning that user-initiated mode is about to be entered and explaining consequential effects, such as that reports automatically notified to a support provider may be ignored, and the user-initiated mode indication 122 is stored in the event log 120 in response to activation of a confirmation icon (not shown) of the confirm user-initiated mode pop-up. Subsequent to entry to the user-initiated mode, returning to the initialized system properties screen 505, partially shown in FIG. 8, displays new condition/state information 506, including information 810 that the user-initiated mode is active, in addition to the operational and license state information.

On expiry of the time parameter input to the data input field 720, the management application 341 causes a user-initiated mode stop indication 123 to be entered in the event log 120. In some examples, activating the "configure user-initiated service mode (UISM)" icon 610 of the system options screen 600 when in the user-initiated mode causes a configure user-initiated mode screen 900 to display (FIG. 9), different to the screen 700 that displays when not in user-initiated mode. The screen 900 displays status information 905 and further configuration icons "restart service mode" 910 and "stop service mode" 911. In some embodiments, further information is conveniently displayed in the configure user-initiated mode screen 900, for example relating to the time left before timeout of the present user-initiated service mode, and the reason information previously entered using the reason data input field 715. In some embodiments, further icons can be included as appropriate, for example an icon to cancel out of the configure user-initiated mode screen 900.

Activating the "restart service mode" icon 910 causes the processor 330 to store a further user-initiated mode start indication 122 in the event log 120. Prior to enabling activation of the restart service mode icon 910, a time parameter data input field 920 requires entering of a time value representing a new duration of the user-initiated mode. The input time data in some examples is stored in the event log 120 as part of the user-initiated mode indication 122. In some examples, in response to activation of the restart service mode icon 910 a confirm user-initiated mode pop-up (not shown) displays, and the user-initiated mode indication 122 is stored in the event log 120 in response to activation of a confirmation icon (not shown) of the confirm user-initiated mode pop-up.

Activating the "stop service mode" icon 911 causes the processor 330 to store a user-initiated mode stop indication 123 in the event log 120. In some examples, in response to activation of the stop service mode icon 911, a confirm user-initiated mode pop-up (not shown) displays, and the user-initiated mode stop indication 123 is stored in the event log 120 in response to activation of a confirmation icon (not shown) of the confirm user-initiated mode pop-up. The confirm user-initiated mode pop-up in some examples displays information explaining consequences of stopping user initiated service mode, for example that necessary support calls may be automatically sent to a remote support provider.

Figure 4:
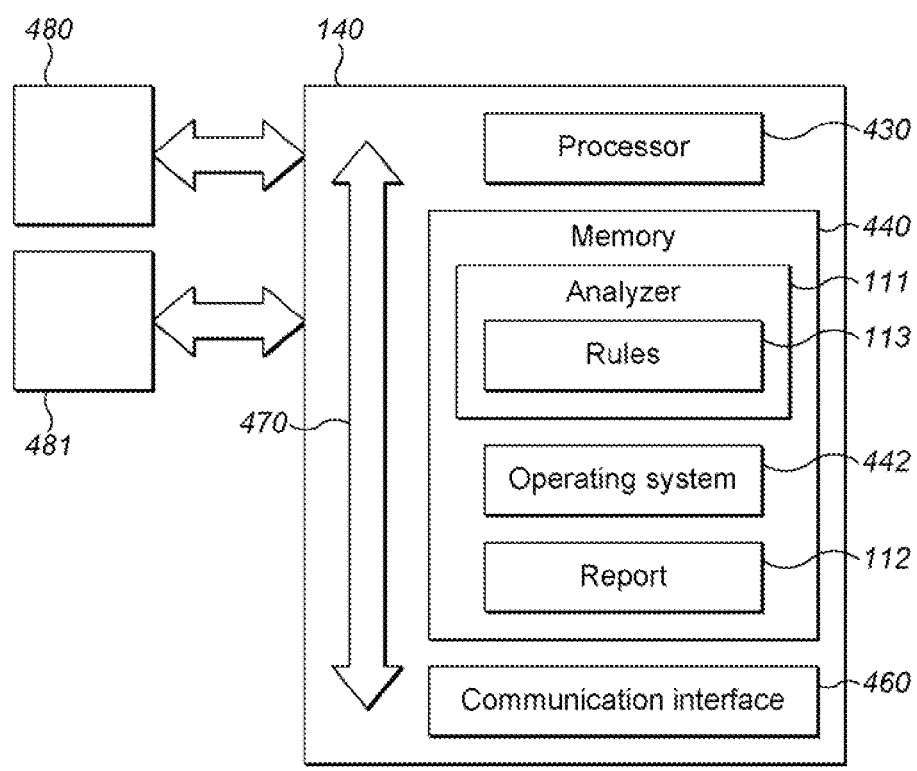
FIG. 4 illustrates an example monitor and report system of the arrangement in more detail.

Referring to FIG. 4, in some implementations, the computer system 110 comprises a processor 430, memory 440, a communication interface 460 and a communication link or bus 470. The memory 440 stores machine readable instructions loadable for execution in the processor 430 to provide the analyzer 111 and an operating system 442. At least some of the functionality of the computer system 110 can in some examples be provided by hardware logic circuitry (not shown). In some examples, the computer system 110 comprises a general purpose computer system. In some examples, user input/output devices such as a display 480 for displaying a graphical user interface or command line interface, and keyboard and/or mouse 481 are communicatively connected to the processor 430 through the bus 470.

The analyzer prepares diagnostic reports 112, which in some examples are stored in memory 440. In some examples, the analyzer 111 is located remotely from a location of a support provider system 140, and is configured to initiate notification of a report 112 over a communication link 141 to the support provider system 140. Rules 113 stored in the memory 440 are accessed by the analyzer 111 to prepare the reports using information relating to present conditions of the monitored system 120, including information in the event log 120, and to determine notification of the reports.

In some embodiments, the monitored, system 130, management system 150 and the monitor and report system 110 are disposed remotely from a support provider system 140. In some examples, the rules 113 cause the analyzer 111 to initiate notification of the report 112 to a remote system, and to select a destination remote system for the notification according to a present user-initiated mode status. For example, the rules 113 cause the analyzer 111, in response to detecting user-initiated event information 122 indicating the start of a user-initiated event mode, to continue to initiate communication of event reports 112 concerning the monitored system 130 to the remote support provider system 140, and to include in the reports a present user-initiated event mode status indication. In alternative examples, the rules 113 cause the analyzer 111 remote support application, in response to detecting user-initiated event information indicating the start of a user-initiated event mode, to discontinue communication of the event reports 112 concerning the monitored system 130 to the remote support provider system 140. In the latter example, communication of the event reports 112 may be initiated to a remote customer-accessible system (not shown), for access by a customer system administrator.

Portions of an example report 112 are shown below, relating to a problem that a controller of an EVA (enterprise virtual array) monitored system 130 identified as "LE Boise" has begun booting:

Problem Found: CUST: Informational only: LE_Boise: A
controller has begun booting: 5005-08B4-0008-097F at Tue 11
May 2010 10:26:17 GMT-06:00
Problem Report Times:
Event Time: Mon 10 May 2010 11:07:42 GMT-06:00
Report Time: Tue 11 May 2010 10:26:17 GMT-06:00
Expiration Time: Mon 10 May 2010 11:07:42 GMT-06:00
Managed Entity:
Storage Management Server: sesanxlboise
Controller Type: HSV300
Firmware Version: CC16CE 09530000
WWN & Storage System Name: 5001-4380-0119-5C30 LE_Boise
Entitlement Information:
Product ID: -- Not Available
Serial Number: -- Not Available
Service Obligation Data:
Service Obligation: Valid
Service Obligation Number:
System Serial Number:
Service Provider Company Name: Hewlett-Packard Company
Device Type:
EVA
Brief Description:
CUST: Informational only: LE_Boise: A controller has begun
booting: 5005-08B4-0008
Rule ID:
Storage_Lx_SCS -- V 1.02 Event Code: (03 03 00 0A)
Rule Severity:
Informational
Reporting Node:
LE_Boise
Full Description:
An HSV300 controller has begun booting. The controller is
reported in the FRU list. Related information is reported in
the evidence section. Where available, possible causes of the
controller having to reboot are also reported.
This is an Customer only notification.
A notification will not be sent to remote support services.
Failed Component Type:
Controller
Recommended Action:
No action necessary.
Controller Model ID: HSV300
WWN of this controller: 5005-08B4-0008-097F
FRU List:
System Identification --
Storage System Name: LE_Boise
Storage System World Wide ID: 5001-4380-0119-5C30
OS Version: Windows 5.2 Service Pack 2 build 3790
Device Type: HSV Controller
Logging Controller Serial Number: P5512G19SV804C
CommandView Version: 9.03.00.100505
EVA User Initiated Service Mode Flag: 1
WWN of this controller: 5005-08B4-0008-097F
FRU Location(s):
WWN of this controller: 5005-08B4-0008-097F
Evidence:
Local Event Time : Mon 10 May 2010 11:07:42 GMT-06:00
Controller Report Time: 10-May-2010 17:05:05.967
EVA Log Description:
0303000a: CAC=00 - Storage System State Services State Change A
Storage System state change Sequence Number: 15474
Rule#: Storage_Lx_SCS -- V 1.02 Event Code: (03 03 00 0A)
Full Corrective Action Statement:
No action necessary.
Controller Model ID: HSV300
WWN of this controller: 5005-08B4-0008-097F
--------------------------------------------------------
like events in last 24 hours: 1
Summary of Controller Booting events in last 24 hours:
Seq # Controller Report Time Local Event Time
~~~~~~~~~~ ~~~~~~~~~~~~~~~~~~~~~~~~ ~~~~~~~~~~~~~~~~~~~~~~~~
15474 10-May-2010 17:05:05.967 Mon 10 May 2010 11:07:42 GMT-
06:00
WWN of controller: 5005-08B4-0008-097F
Summary of Reboot events for -continued 5001-4380-0119-5C30 LE_Boise
Sequence # Local Event Time
---------- ------------------------
15474 Mon 10 May 2010 11:07:42 GMT-06:00
Summary of Termination events for
5001-4380-0119-5C30 LE_Boise
Sequence # Local Event Time Event Termination
---------- ------------------------------------- ------------- -------------
15264 Mon 10 May 2010 11:05:22 GMT-06:00 (04 01 03 1C) (03 64
00 21)
No action necessary.
Notifications:
Customer,Script,Browser,Console
Analysis Mode:
Manual In the example report 112 of the immediately preceding paragraph, the report 112 is notified to the remote customer system only, and not the support provider system 140, and this information is included in the report 112 in the Full Description section. A user-initiated event mode status indication is included in the report 112 in the FRU (field replaceable unit) List section noting that a user initiated service mode flag is set to a value of 1, that is, that the user initiated service mode is active. In alternative examples, such a report 112 is notified to the remote support provider system 140, and alternative information is included in the in the Full Description section of the report 122, for example indicating that the support provider should ignore the report as a user initiated service mode is active.

The user-initiated event mode status indication in some example reports 112 includes information relating to at least one of a duration or an expiry of a user-initiated mode active time period. For example, updated user-initiated mode status information in a report 112 can relate to at least one of a start time of the user-initiated mode, an end time of the user-initiated mode, a time to expiry of the user-initiated mode, and an instant user-initiated mode status. The user-initiated event mode status indication in some example reports 112 includes information relating to at least one of an instant state of a user-initiated mode flag, an indication that a remote support provider will not take action on the report based on an instant user-initiated mode status, and an indication that notification of the report will not be initiated to a specified remote support system.

Portions of an further example report 112 are shown below relating to a start of a user-initiated mode on the EVA (enterprise virtual array) monitored system 130 "LE Boise":

Problem Found: Informational only: LE_Boise: User-Initiated
Service Mode (UISM)
Start at Wed 5 May 2010 13:48:05 GMT-06:00 on 5001-4380-
0119-5C30 LE_Boise at
Fri 14 May 2010 12:26:38 GMT-06:00
Problem Report Times:
Event Time: Wed 5 May 2010 13:48:05 GMT-06:00
Report Time: Fri 14 May 2010 12:26:38 GMT-06:00
Expiration Time: Thu 6 May 2010 13:48:05 GMT-06:00
Managed Entity:
Storage Management Server: sesanxlboise
WWN & Storage System Name: 5001-4380-0119-5C30 LE_Boise
Entitlement Information:
Storage System WWN: 5001-4380-0119-5C30
Storage System Name String: LE_Boise
Product ID: -- Not Available
Serial Number: -- Not Available
Service Obligation Data:
Service Obligation: Valid
Service Obligation Number:

```
System Serial Number:
Service Provider Company Name: Hewlett-Packard Company
Device Type:
EVA
Brief Description:
Informational only: LE_Boise: User-Initiated Service Mode
(UISM) Start at Wed 5 May 2010 Rule ID:
Storage_Lx_CV_USIM -- V 1.00 Event Code: 13022
Rule Severity:
Informational
Repotting Node:
LE_Boise
Full Description:
User-Initiated Service Mode (UISM) Start at Wed 5 May 2010
13:48:05 GMT-06:00 on 5001-4380-0119-5C30 LE_Boise
All events will continue to be analyzed and reports generated.
However, they will be ignored by support provider.
13022: User initiated service mode begin. Timeout(minutes): 2,
Reason: royc did this on ELC: If ISEE is enabled, an Event Log
Collection (ELC) was sent with this report.
Failed Component Type:
UISM
Recommended Action:
13022: User initiated service mode begin. Timeout(minutes): 2,
Reason: royc did this on User-Initiated Service Mode (UISM)
start.
The EVA has been put into maintenance mode. All events will
continue to be analyzed and reports generated. However, they
will be ignored by support provider.
Storage Management Server: sesanxlboise
Storage System Name: LE_Boise
Storage System WWN: 5001-4380-0119-5C30
Last Time Stamp: Wed 5 May 2010 13:48:05 GMT-06:00
CommandView Time Stamp: 1273088885
FRU List:
System Identification --
Storage System Name: LE_Boise
Storage System World Wide ID: 5001-4380-0119-5C30
OS Version: Windows 5.2 Service Pack 2 build 3790
Device Type: HSV Management
Logging Controller Serial Number: P5512G19SV800V
CommandView Version: 9.03.00.100505
EVA User Initiated Service Mode Flag: 1
FRU Location(s):
Storage System Name: LE_Boise
Storage System World Wide ID: 5001-4380-0119-5C30
Evidence:
Event Code (EC) = 13022:
13022: User initiated service mode begin. Timeout(minutes): 2,
Reason: royc did this Corrective Action:
User-Initiated Service Mode (UISM) start.
The EVA has been put into maintenance mode. All events will
continue to be analyzed and reports generated. However, they
will be ignored by support provider.
    Storage Management Server: sesanxlboise
    Storage system Name: LE_Boise
    Storage System WWN: 5001-4380-0119-5C30
    Last Time Stamp: Wed 5 May 2010 13:48:05 GMT-06:00
    CommandView Time Stamp: 1273088885
User-Initiated Service Mode (UISM) Start at Wed 5 May 2010
13:48:05 GMT-06:00 on 5001-4380-0119-5C30 LE_Boise
All events will continue to be analyzed and reports generated.
However, they will be ignored by support provider.
13022: User initiated service mode begin. Timeout(minutes): 2,
Reason: royc did this on
Storage System Name: LE_Boise
Storage System WWN: 5001-4380-0119-5C30
Last Time Stamp: Wed 5 May 2010 13:48:05 GMT-06:00
CommandView Time Stamp: 1273088885
Summary of possible Communication Events on this Storage
System:
Event Code key
8090 = NO Devices Found On Loop
8092 = The Storage Array's name has changed
8093 = A New Storage Array has been discovered
8094 = The EVA Storage Cell was Uninitialized
8095 = The EVA Storage Cell was Initialized
8097 = The EVA Storage Cell is now being managed by this
instance of Command View EVA
8098 = This instance of Command View EVA is no longer managing
the storage cell
8099 = This instance of Command View EVA has lost communication
with the storage cell
8100 = This instance of Command View EVA has no path to the
master controller
13021 = Remote Service Test event
13022 = User-Initiated Service Mode (UISM) start
12023 = User-Initiated Service Mode (UISM) stop
EC Storage System WWN Storage System Name Event Time
------ -------------------- ------------------------------ ----
---------------
13022 5001-4380-0119-5C30 LE_Boise 1273088885
Notifications:
All
Analysis Mode:
Manual
```

In the example report 112 of the immediately preceding paragraph, the report 112 is notified to the support provider system 140 and the remote customer system, and information explaining that all events will continue to be analyzed and reports generated, but reports will be ignored by the support provider, is included in the report 112, for example in the Full Description and Recommend Action sections. A user-initiated event mode status indication is included in the report 112 in the FRU List section, where the user initiated service mode flag is set to a value of 1. User-initiated event mode status indication information also specifies that the user-initiated event mode has begun, and a time duration of two minutes, for example in the Full Description section of the report 112. In some examples, analogous reports 112 notifying an end of the user-initiated event mode are also similarly notified.

Figure 10:
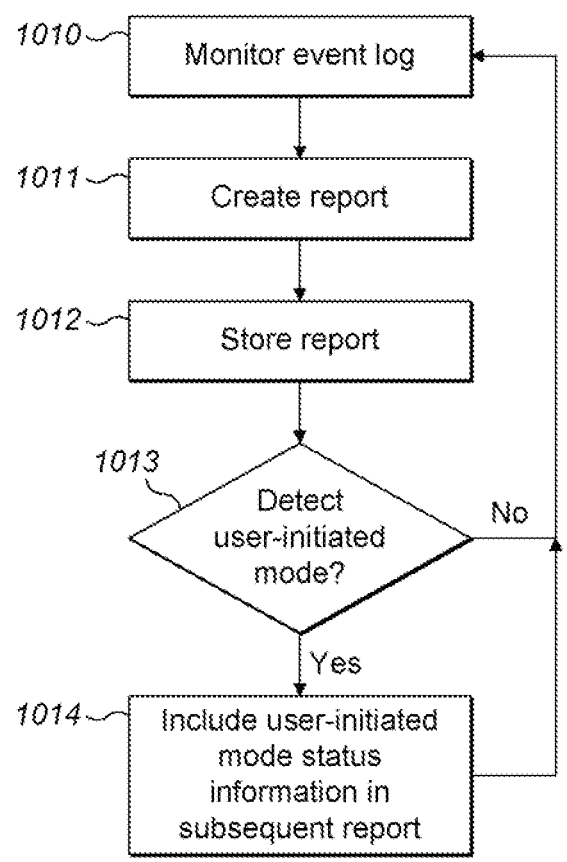
FIG. 10 is a flow diagram illustrating a method of monitoring a system.

Using a remote monitoring arrangement as described above, the monitored system 130 can be monitored using a processor, for example the processor 430, to automatically monitor the event log 120 communicatively connected to the monitored system 130 (block 1010, FIG. 10). Reports 112 can be created (block 1011, FIG. 10) and stored (block 1012, FIG. 10) in memory 440 by the processor 430, under control of the machine readable instructions in memory 440 that execute on the processor 430 to provide the analyzer 111. The processor 430, in response to detecting user-initiated mode event information in the event log 120 (block 1013, FIG. 10), includes in a subsequent report 112 updated user-initiated mode status information (block 1014, FIG. 10). If no user-initiated mode is detected, the automatic monitoring continues. The processor 430 in some examples selects a destination of notification of the report 112 according to the user-initiated mode status, for example discontinuing notification to the support provider system 140 if user-initiated mode is detected.

Various embodiments described above relate to remote monitoring processes to capture events from managed systems, located for example at a customer site geographically remote from a location of a support provider system, filtering those events, for example on a computer system located at the remote customer site, and submitting actionable events to a support provider system to facilitate timely and appropriate provision of support for those events, for example, based on a customer's level of support entitlement. Remote support applications in some examples can collect reactive and proactive data from managed systems, such as servers, storage devices, other general purpose or application specific computing devices, embedded systems, appliances or any other type of system that can provide management information, providing device level communication means for gathering the data. The data in some examples includes information such as IP addresses, system details, and system administrator contact information. Any suitable systems management technique can be used for gathering and communicating the data. Device discovery, security, and user interface hosting services functionality may also be provided.

In some implementations, the user of support services pushes a hardware or software button on a monitored device or device management graphical user interface (GUI), and a "User-initiated Service Event" is entered in a device log, causing diagnostic software analyzing the log to enter a User-initiated Service Mode (UISM). In this mode, the diagnostic tool changes how it communicates service incidents to the support provider. This facilitates that the support provider does not react unnecessarily to service incidents caused by known user-initiated events, facilitating cost reduction in that a very significant proportion of actioned remote support provider incidents are associated with a user carrying out service actions on monitored devices. In some implementations, the user-initiated service mode allows users to conveniently indicate to a remote support provider, from a user interface local to the monitored device, when they are taking service action. In some implementations, information relating to monitored events will still be sent to the remote support provider system, but will be ignored.

The buses 270, 370, 470 provide one or more communication paths, for communication of data and instructions between the various respective elements such as processor, memory, logic circuitry and communication interface within each of the monitored system 130, management system 150 and monitor and report system 110, and can be implemented using any convenient type or combination of communication technologies and protocols.

The communication interfaces 260, 360, 460 provide communications between computer systems such as, in some embodiments, between the monitored system 130 and management system 150, and between the management system 150 and the monitor and report system 110, using any convenient technology and protocol, including wired or wireless technology. In some embodiments, management data is communicated over a network based on one of the Ethernet family of network technologies, using TCP/IP for example, and the communication interfaces 260, 360, 460 comprise respective network interface controllers. In alternative embodiments, any other appropriate physical layer and/or higher layer network technologies can be employed.

The communication links 121, 131, 141 and 151 can be provided using any convenient technology, depending for example, whether the links are internal of a system or between systems. In some examples the communication links 121, 131, 141 and 151 may include one or more of the buses 270, 370, 470 and the communication interfaces 260, 360, 460.

Examples of convenient systems management technologies that can be used to expose management (event) information on the monitored system 130 and communicate the information to the management system 150 are: SNMP (simple network management protocol), WBEM (web-based enterprise management), DCOM (distributed component object model), HTTP, HTTPS, XML or any other suitable technique. The agent 132 comprises in some examples at least one of a CIMOM (common information model agent object manager), WBEM (web-based enterprise management) provider, SMI-S (storage management initiative specification), or SNMP (simple network management protocol) agent.

The term memory as used herein relates to any appropriate type or combination of types of storage device implemented as one or more computer-readable or machine-readable storage media. The storage media store data and machine readable instructions to load for execution on a processor 230, 330, 430 to respectively provide the various described functions of, for example, the monitored system 130, the management system 150, the event log memory 124 and the monitor and report system 110.

The term processor as used herein can include for example a microprocessor, microcontroller, processor module or subsystem, programmable integrated circuit, programmable gate array, another control or computing device, and any combination of multiple processors or types of processor.

The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

Implementations according to some embodiments are not limited to the fields of storage or server technology, but can be used wherever device management information is logged and analyzed, for example in remote reporting and diagnostic systems in the fields of automotive systems, medical monitoring and diagnostic systems, or any other appropriate type of managed system.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A remote support system comprising program code stored on a non-transient computer-readable medium and executable by a processor, the system further comprising:
 a communication link to connect to an event log associated with a monitored system; and
 an analyzer to monitor the event log over the link and to create a report using information in the event log, wherein in response to the analyzer detecting a user-initiated service mode indication in the information the analyzer includes in the report additional information relating to the user-initiated service mode to indicate events in the report to be ignored.

2. The remote support system of claim 1, wherein the additional information comprises user-initiated mode status information.

3. The remote support system of claim 1, wherein the additional information comprises information relating to at least one of: a start time of a user-initiated mode; an end time of a user-initiated mode; a time to expiry of a user-initiated mode; an instant user-initiated mode status; an instant state of a user-initiated mode flag; an indication that a remote support provider will not take action on the report based on an instant user-initiated mode status; an indication that notification of the report will not be initiated to a support provider system.

4. The remote support system of claim 1, an initiator to initiate notification of the report to a support provider system.

5. The remote support system of claim 1, to initiate notification of the report to a remote system, and to select a destination remote system for the notification according to a present user-initiated mode status.

6. A processor-implemented initiator comprising program code stored on a non-transient computer-readable medium and executable by a processor, the initiator being activatable to cause a user-initiated mode indication to be stored in an event log in a memory communicatively connected to the processor, the event log to receive event data relating to a monitored system, the user-initiated mode indication identifying events in the event log occurring during a user-initiated service mode to be ignored by a support provider.

7. The processor-implemented initiator of claim 6, the initiator comprising a hardware actuator of the monitored system, the actuator being activatable by a user to cause a user-initiated signal to be sent to the processor.

8. The processor-implemented initiator of claim 6, the initiator comprising a user-activatable software-generated graphical user-input arrangement.

9. The processor-implemented initiator of claim 6, the user-initiated mode indication being associated with a time parameter, the time parameter having a predetermined value or a value input by a user and stored in the event log.

10. The processor-implemented initiator of claim 6, the initiator being activatable during an active user-initiated mode to change an active time period of the user-initiated mode.

11. The processor-implemented initiator of claim 6, the initiator comprising a user activatable graphical user-input arrangement provided by a management application through a user interface;
the management application to receive event data from the monitored system and store the data in the event log; and
the user interface to display and receive information relating to the management application.

12. The processor-implemented initiator of claim 11, wherein the user interface requires a user to input user-initiated mode time-related information to enable activation of the graphical user-input arrangement.

13. A method comprising receiving from a user of a monitored system, and storing in an event log in a computer-accessible memory, a user-initiated event indication relating to the monitored system, and using a processor to process the user-initiated event indication according to a computer-implemented rule to determine what subsequently received monitored system event information is reported to a support provider, wherein the user-initiated event indication identifies events in the event log occurring during a user-initiated service mode to be ignored by the support provider.

14. The method of claim 13, wherein the rule causes a remote support application, in response to detecting the start of a user-initiated event mode, to continue to initiate communication of event reports concerning the monitored system to a remote support provider, and to include in the reports a present user-initiated event mode status.

15. The method of claim 14, wherein the user-initiated event mode status includes information relating to at least one of a duration or an expiry of a user-initiated mode active time period.

16. The method of claim 13, wherein the rule causes a remote support application, in response to detecting the start of a user-initiated event mode, to discontinue communication of event reports concerning the monitored system to a remote support provider.

17. A method of monitoring a system, the system communicatively connected to a memory storing a system event log, the method comprising:
using a processor to automatically monitor the event log, create reports using information obtained by the monitoring, store the reports in memory communicatively connected to the processor, and in response to detecting user-initiated mode information in the event log, include in a subsequent report updated user-initiated mode status information.

18. The method of claim 17, comprising using the processor to initiate notification of the report to a remote system.

19. The method of claim 18, comprising using the processor to select a destination of the notification according to the user-initiated mode status.

20. The method of claim 17, wherein the updated user-initiated mode status information relates to at least one of: a start time of the user-initiated mode; an end time of the user-initiated mode; a time to expiry of the user-initiated mode; an instant user-initiated mode status; an instant state of a user-initiated mode flag; an indication that a remote support provider will not take action on the report based on an instant user-initiated mode status; an indication that notification of the report will not be initiated to a specified remote support system.

* * * * *